(12) United States Patent
Morrow

(10) Patent No.: US 6,898,718 B2
(45) Date of Patent: May 24, 2005

(54) METHOD AND APPARATUS TO MONITOR PERFORMANCE OF A PROCESS

(75) Inventor: Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 09/967,377

(22) Filed: Sep. 28, 2001

(65) Prior Publication Data

US 2003/0065959 A1 Apr. 3, 2003

(51) Int. Cl.[7] .................................................. G06F 1/26
(52) U.S. Cl. ..................... 713/320; 713/300; 713/322; 713/323; 713/324
(58) Field of Search .................... 713/300, 320, 713/322, 323, 324

(56) References Cited

U.S. PATENT DOCUMENTS

| | | | |
|---|---|---|---|
| 5,590,342 A | * 12/1996 | Marisetty | ..................... 713/324 |
| 5,745,375 A | 4/1998 | Reinhardt et al. | |
| 5,822,598 A | 10/1998 | Lam | |
| 5,887,179 A | 3/1999 | Halahmi et al. | |
| 5,983,355 A | * 11/1999 | Kenny et al. | ................ 713/322 |
| 5,983,356 A | * 11/1999 | Pandey et al. | .............. 713/322 |
| 6,065,069 A | 5/2000 | Klein | |
| 6,128,745 A | * 10/2000 | Anderson et al. | ........... 713/323 |
| 6,216,233 B1 | 4/2001 | Baweja | |
| 6,219,796 B1 | * 4/2001 | Bartley | ....................... 713/320 |
| 6,282,663 B1 | 8/2001 | Khazam | |
| 6,307,281 B1 | * 10/2001 | Houston | ....................... 307/31 |
| 6,795,927 B1 | * 9/2004 | Altmejd et al. | ............. 713/300 |
| 6,795,930 B1 | * 9/2004 | Laurenti et al. | ............ 713/324 |
| 6,845,456 B1 | * 1/2005 | Menezes et al. | ............ 713/320 |

FOREIGN PATENT DOCUMENTS

| | | |
|---|---|---|
| WO | 0712064 A1 | 5/1995 |
| WO | WO 01/35200 A1 | 5/2001 |

* cited by examiner

*Primary Examiner*—A. Elamin
(74) *Attorney, Agent, or Firm*—Trop, Pruner & Hu, P.C.

(57) ABSTRACT

Briefly, in accordance with one embodiment of the invention, a portable communication device has a processing unit and a monitoring unit. The monitoring unit monitors performance of a software process while the process is executing. If the process is executing inefficiently, the processing unit may alter power consumption of the portable communication device.

32 Claims, 2 Drawing Sheets

METHOD AND APPARATUS TO MONITOR PERFORMANCE OF A PROCESS

BACKGROUND

Today, many electronic devices, such as computers and cell phones, use software that includes instructions for controlling the operation of these devices. These instructions are sometimes referred to as software programs or software processes, or simply programs or processes.

Some processes operating within a computing device may adversely affect performance of the computing device. An example of such an inefficient/nonproductive process is a process which makes many accesses to an input/output (I/O) device. If the process spends time idle while waiting for the I/O device to respond, then this may adversely affect performance of the computing device in that the process is not efficiently using the hardware resources of the device.

Thus, there is a continuing need for better ways to execute software in electronic devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the present invention may include an apparatus for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The methods presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
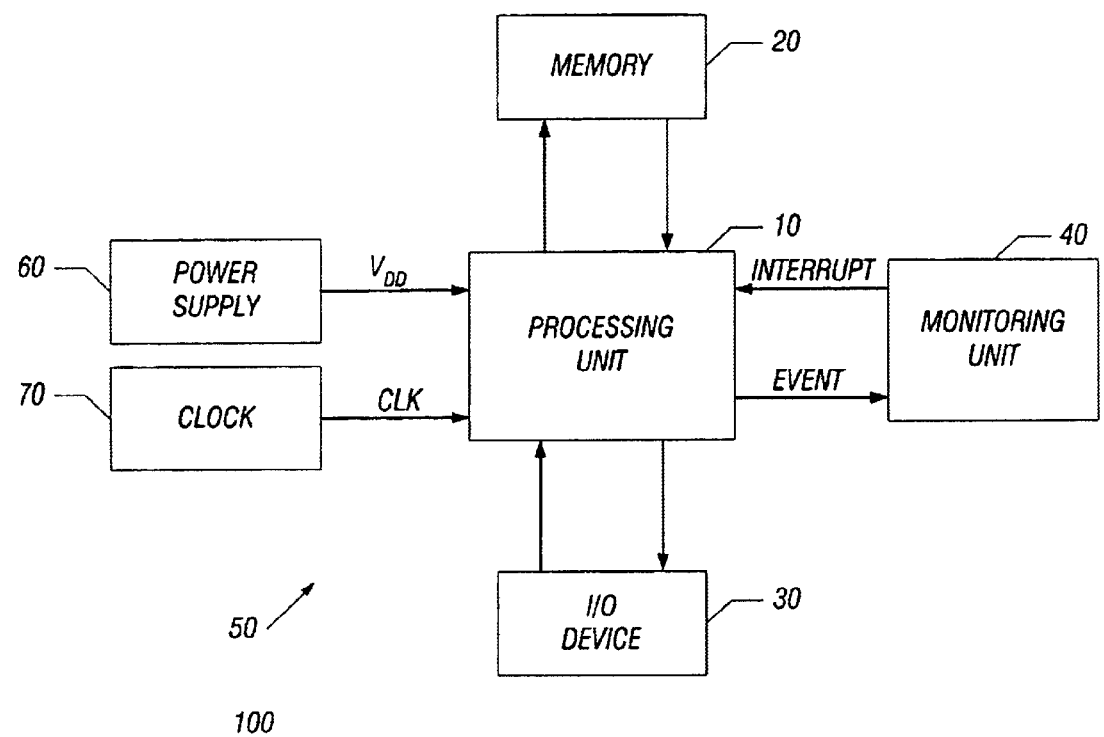
FIG. 1 is a block diagram of a computing device in accordance with an embodiment of the present invention.

Turning to FIG. 1, an embodiment 100 in accordance with the present invention is described. Embodiment 100 may comprise a computing device 50. Computing device 50 may be used in a variety of portable communication systems such as, for example, a mobile communication device (e.g., cell phone), a two-way radio communication system, a one-way pager, a two-way pager, a personal communication system (PCS), a portable computer, a personal digital assistant (PDA), or the like. Although it should be pointed out that the scope and application of the present invention is in no way limited to these examples. For example, other applications where the present invention may be used are non-portable electronic applications, such as in cellular base stations or video equipment.

In this example, computing device 50 includes a processing unit 10 for executing a software program, a memory 20 to store the program, an input/output (I/O) device 30 connected to processing unit 10, and a monitoring unit 40 connected to processing unit 10. In addition, a power supply 60 is connected to processing unit 10 and may provide an operating voltage or source of operating potential such as, for example, a voltage labeled $V_{DD}$. A clock 70 is connected to processing unit 10 and may provide a clock signal label CLK. Although memory 20, I/O device 30, monitoring unit 40, power supply 60, and clock 70 are shown as directly connected to processing unit 10, the scope of the present invention is not limited in this respect. For example, memory 20 may be coupled to processing unit 10 via a memory controller (not shown).

The operating speed of processing unit 10 may be changed by altering the frequency of signal CLK. Power consumption of processing unit 10 may be altered by altering operating voltage $V_{DD}$ or altering the frequency of signal CLK. For example, the power consumption of processing unit 10 may be reduced by reducing voltage $V_{DD}$ or reducing the frequency of signal CLK.

Processing unit 10 may comprise, for example, a microprocessor, a digital signal processor, a microcontroller, or the like. Processing unit 10 may be used to execute software for controlling the operation of computing device 50. In addition, processing unit 10 may be used to execute a program for processing data received from I/O device 30, although the scope of the present invention is not limited in this respect.

Instructions to be executed by processing unit 10 may be stored in memory 20, although the scope of the present invention is not limited in this respect. Memory 20 may be volatile or non-volatile memory, although the scope of the present invention is not limited in this respect. Memory 20 may comprise, for example, disk including floppy disks, optical disks, CD-ROMs, magnetic-optical disks, read-only memories (ROMs), random access memories (RAMs) such as dynamic RAM (DRAM) or static RAM (SRAM), electrically programmable read-only memories (EPROMs), electrically erasable and programmable read only memories (EEPROMs), magnetic or optical cards, or any other type of media suitable for storing electronic instructions.

I/O device 30 may be used for receiving data from a user or may be used for transmitting data to a user. I/O device 30 may comprise, for example, a keyboard, a display, or a printer, although the scope of the present invention is not limited in this respect.

Monitoring unit 40 may be used to monitor the performance of a software process running in processing unit 10. In this embodiment, monitoring unit 40 may be adapted to monitor a software process operating in processing unit 10 while the process is being executed. Specifically, monitoring unit 40 may be adapted to determine if the process is operating at or below a predetermined threshold level of performance.

Processing unit 10 and monitoring unit 40 may be implemented within a microprocessor rather than implemented as separate devices. For example, processing unit 10 may be a processor core and monitoring unit 40 may be a performance monitoring unit (PMU) within a microprocessor. Alternatively, the function of monitoring unit 40 may be implemented using software rather than hardware.

Figure 2:
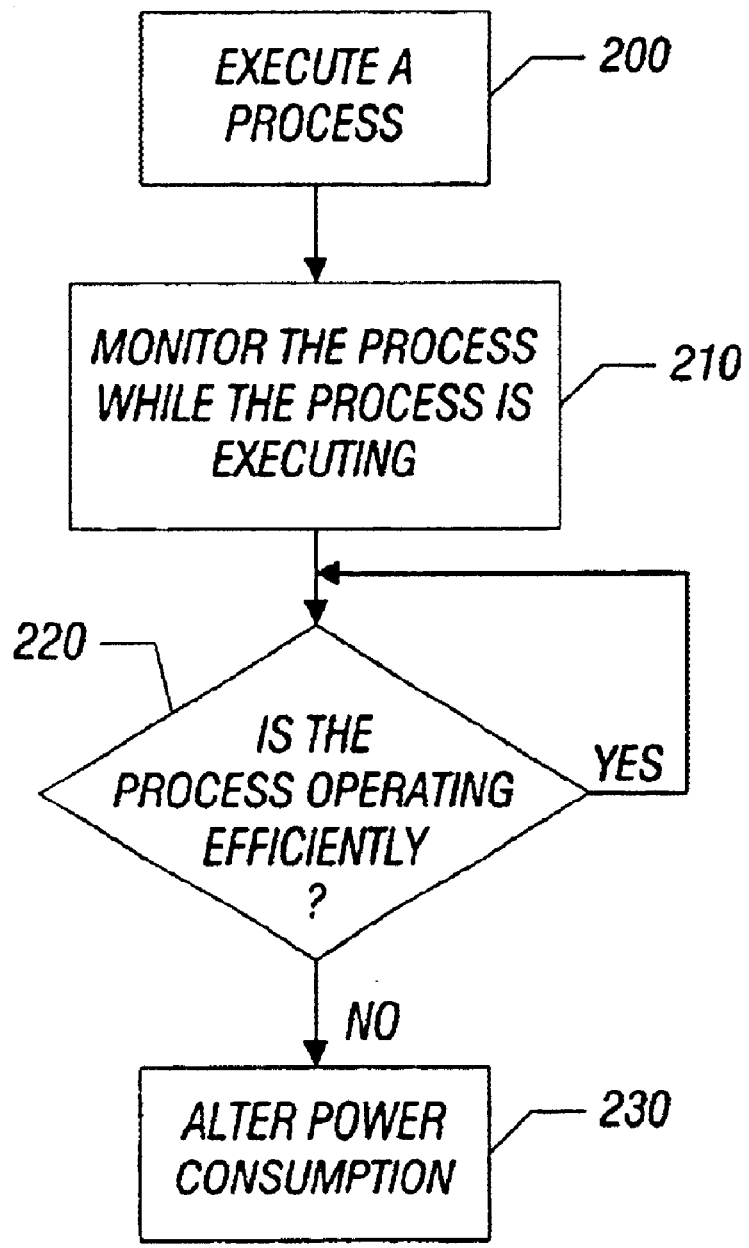
FIG. 2 is a flow chart of a method of monitoring a process in accordance with an embodiment of the present invention.

Turning now to FIG. 2, a method in accordance with an embodiment of the present invention is provided. This embodiment may begin with executing a software process, block 200. This method may be implemented using computing device 50 of FIG. 1. The software process may be executed using processing unit 10, which may employ an operating system for controlling execution of the software process. Alternatively, processing unit 10 may directly execute the software process without using an operating system.

The process may be monitored while executing to determine if the process is operating efficiently, block 210. By way of example, monitoring unit 40 (FIG. 1) may be used to monitor the process operating within processing unit 10. The efficiency or performance of a software process may be defined and determined in a number of ways. For example, a software process may be defined as inefficient if the process does not produce the effect intended or desired or is wasteful in terms of factors like time, energy, etc. As an example, performance of a software process may be measured in terms of the power consumed by computing device 50 while executing the process. In another example, if a process spends an excessive amount of time waiting for an I/O device or memory to respond, this may be defined as an inefficient use of the computing device's resources since clock cycles are spent waiting, rather than executing another productive instruction.

Performance of a software process may be determined by monitoring the number of occurrences of a performance-related event. Examples of performance-related events include memory-related processor stalls, cache misses (e.g., instruction and/or data), stalls from heavy use of a coprocessor (e.g., floating point operations), the amount of time the processor is idle while waiting for an I/O device or memory to respond, or the like. It should be pointed out that this list of performance-related events is not exhaustive, and that the present invention may be adapted to monitor any event or combinations of events that are indicative of performance with respect to factors such as, for example, time or energy.

By way of example, processing unit 10 may program monitoring unit 40 to look for a defined performance-related event, and then notify processing unit 10 if the defined event occurs. Monitoring unit 40 may be a PMU that is programmed to watch for memory-related processor stalls. The PMU may include a counter for counting the number of memory-related processor stalls. Before running a process, processing unit 10 may program monitoring unit 40 to transmit an interrupt when more than 10,000 memory-related processor stalls are counted. In this example, the predetermined threshold level of performance or defined event is 10,000 memory-related processor stalls. If more than 30,000 clock cycles and 10,000 memory-related processor stalls have occurred, then from this information, the operating system within processing unit 10 may determine that the process is "memory bound." In response, the operating system may terminate or suspend the process and enter a low power mode of operation to reduce power consumption of the computing device, thereby increasing performance of computing device 50. In an alternate embodiment, the performance-related event or threshold level may be defined as a maximum number of I/O accesses. Monitoring unit 40 may detect or identify if the threshold level has been reached by counting the number of times I/O device 30 is accessed by a currently executing software process. If the number of I/O accesses is greater than the predetermined number of I/O accesses, then monitoring unit 40 may notify processing unit 10 by transmitting an interrupt to processing unit 10. The interrupt may serve as an alert for notifying processing unit 10 that the defined event has occurred.

Monitoring unit 40 may be implemented to monitor a software process non-intrusively. In other words, rather than suspending execution of the process, monitoring unit 40 may be adapted to monitor the software process while the process is executing. This is referred to as monitoring an active process. An active process is a process that is currently running or executing. One way monitoring an active process may be accomplished is monitoring the results of execution of the software process rather than monitoring the process directly. For example, the number of times I/O device 30 is accessed by the software may be obtained directly from I/O device 30 rather than by directly monitoring the software or processing unit 10. In an alternate embodiment, this information may be obtained by monitoring data on a data bus between processing unit 10 and I/O device 30, although the scope of the present invention is not limited in this respect.

Monitoring unit 40 may monitor the software process running in processing unit 10 to determine if the process is operating efficiently, block 220. If the software process is not operating efficiently, the power consumption of processing unit 10 may be altered, block 230. By altering the power consumption of processing unit 10, the performance of computing device 50 may be increased. It should be understood that since processing unit 10 is a component of computing device 50, that altering the power consumption of processing unit 10 also may alter the power consumption of computing device 50, although the scope of the present invention is not limited in this respect.

In the example shown in FIG. 1, monitoring unit 40 evaluates performance-related event information (labeled Event) from processing unit 40. If monitoring unit 40 determines that the software process is operating below a predetermined threshold level of performance, monitoring unit 40 may preempt the software process currently running in processing unit 10 by transmitting an interrupt signal (labeled Interrupt) to processing unit 10.

If processing unit 10 employs an operating system, then the operating system may terminate or suspend the process in response to the interrupt. The operating system may execute a different process to make more efficient use of computing device 50, e.g., by either increasing or decreasing the power consumption of computing device 50. In an alternate embodiment, in response to the interrupt from monitoring unit 40, the frequency of signal CLK may be decreased to reduce the power consumption of computing device 50. In yet another embodiment, the operating voltage ($V_{DD}$) of processing unit 10 may be reduced in response to the interrupt from monitoring unit 40. In addition, any combination of the above methods for altering power consumption may be employed in response to the interrupt from monitoring unit 40. For example, both the operating voltage ($V_{DD}$) and the frequency of signal CLK may be reduced in response to the interrupt from monitoring unit 40. It should be noted that the scope of the present invention is not limited to these methods for altering the power consumption of computing device 50. Other methods for altering power consumption may be employed in response to identification of an inefficient software process.

In portable electronic applications, it may be desirable to reduce power consumption in order to increase battery life. Therefore, if a software process is adversely affecting power consumption, then the software process may be suspended and delayed until the portable communication device is connected to a stable power supply (e.g., plugged into the wall). This may be desirable to save power associated with the processing that would otherwise drain the battery. In other applications, if the software process is not producing an intended result, then increasing the power consumption may be desirable. For example, if a process is exhibiting poor performance, then the clock rate of the computing system may be increased to complete the process in a relatively shorter amount of time. By increasing the clock rate, the power consumption of the computing system may be increased. After executing the inefficient process, the computing system may enter a low power mode of operation.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
    monitoring an active software process to determine if the active software process is operating at or below a predetermined level of performance, wherein monitoring the active software process includes counting a number of occurrences of a defined performance-related event; and
    altering power consumption of a device if the active software process is operating at or below the predetermined level of performance.

2. The method of claim 1, wherein altering power consumption of the device includes preempting the active software process.

3. The method of claim 1, wherein altering power consumption of the device includes:
    suspending operation of the active software process; and
    executing another active process.

4. The method of claim 1, wherein altering the power consumption of the device includes reducing the power consumption of the device.

5. The method of claim 1, wherein altering the power consumption of the device includes increasing the power consumption of the device.

6. The method of claim 1, wherein altering the power consumption includes reducing an operating voltage of the device.

7. The method of claim 1, wherein altering the power consumption includes reducing a clock speed of the device.

8. The method of claim 1, wherein counting the number of occurrences of the defined performance-related event includes counting a number of times an input/output (I/O) device is accessed by the active software process.

9. The method of claim 1, wherein monitoring further includes determining if the number of occurrences of the defined performance-related event is greater than a predetermined number of occurrences and wherein altering power consumption further includes altering power consumption of a device if the number of occurrences of the defined performance-related event is greater than the predetermined number of occurrences.

10. A method, comprising:
    monitoring a software process while the software process is executing to determine if a defined event has occurred, wherein the defined event indicates efficiency of the process and wherein monitoring the software process while the software process is executing includes counting a number of occurrences of a performance-related event; and
    reducing a voltage potential after occurrence of the defined event.

11. The method of claim 10, wherein the defined event occurs when the number of occurrences of the performance-related event is greater than a predetermined number of occurrences.

12. The method of claim 10, wherein the performance-related event is a memory access.

13. The method of claim 10, further comprising generating an interrupt signal upon the occurrence of the defined event, wherein the voltage potential is reduced after generating the interrupt signal.

14. An article comprising a storage medium having stored thereon instructions, that, when executed by a computing platform, results in;
    monitoring an active software process to determined if the active software process is operating at or below a predetermined level of performance, wherein monitoring the active software process includes counting a number of occurrences of a defined performance-related event; and
    altering power consumption of a device if the active software process is operating at or below the predetermined level of performance.

15. The article of claim 14, wherein altering the power consumption includes reducing an operating voltage of the device.

16. The article of claim 14, wherein altering the power consumption includes reducing a clock speed of the device.

17. A system comprising:
    a processing unit adapted to execute a software process; and
    a monitoring unit adapted to monitor the software process while the software process is executing to determine efficiency of the software process by counting a number of occurrences of a performance-related event and adapted to notify the processing unit to alter power consumption of the system if the number of occurrences of the performance-related event is greater than a predetermined number of occurrences.

18. The system of claim 17, wherein the processing unit is a processor core.

19. The system of claim 17, wherein the monitoring unit is a performance monitoring unit (PMU).

20. The system of claim 17, further comprising a static random access memory coupled to the processing unit and wherein the static random access memory is adapted to store the software process.

21. The system of claim 17, further including an input/output (I/O) device coupled to the processing unit.

22. The system of claim 17, wherein the processing unit reduces the power consumption of the system in response to the notification from the monitoring unit.

23. The system of claim 17, wherein the system is portable communication device.

24. The system of claim 17, wherein the system is a cell phone.

25. The system of claim 17, wherein the system is portable computer.

26. A method, comprising:

monitoring a software process while the software process is executing to determine efficiency of the software process by counting a number of occurrences of a performance-related event; and altering power consumption of a device if the number of occurrences of the performance-related event is greater than a predetermined number of occurrences.

27. The method of claim 26, wherein altering the power consumption includes reducing an operating voltage of the device.

28. The method of claim 26, wherein altering the power consumption includes reducing a clock speed of the device.

29. The method of claim 26, wherein altering power consumption of the device includes:

suspending operation of the software process; and executing another software process.

30. The method of claim 26, wherein monitoring a software process while the software process is executing includes monitoring the number of times an I/O device is accessed by the software process.

31. The method of claim 26, wherein counting the number of occurrences of the defined performance-related event includes counting a number of times an input/output (I/O) device is accessed by the active software process.

32. The method of claim 26, further comprising generating an interrupt signal if the number of occurrences of the performance-related event is greater than a predetermined number of occurrences, wherein the power consumption is reduced in response to the interrupt signal.

\* \* \* \* \*